(12) United States Patent
Fischer et al.

(10) Patent No.: US 11,310,061 B2
(45) Date of Patent: Apr. 19, 2022

(54) CAPABILITY REVOCATION IN A CONTENT CONSUMPTION DEVICE

(71) Applicant: NAGRAVISION SA, Cheseaux-sur-Lausanne (CH)

(72) Inventors: Jean-Bernard Fischer, Cheseaux-sur-Lausanne (CH); Patrick Servet, Cheseaux-sur-Lausanne (CH); Didier Hunacek, Cheseaux-sur-Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 93 days.

(21) Appl. No.: 16/768,608

(22) PCT Filed: Nov. 28, 2018

(86) PCT No.: PCT/EP2018/082781
§ 371 (c)(1),
(2) Date: May 29, 2020

(87) PCT Pub. No.: WO2019/105973
PCT Pub. Date: Jun. 6, 2019

(65) Prior Publication Data
US 2021/0176078 A1   Jun. 10, 2021

(30) Foreign Application Priority Data
Dec. 1, 2017  (EP) ...................................... 17205022

(51) Int. Cl.
*H04L 9/32*  (2006.01)

(52) U.S. Cl.
CPC .......... *H04L 9/3268* (2013.01); *H04L 9/3247* (2013.01)

(58) Field of Classification Search
CPC ................ H04L 9/3268; H04L 9/3247; H04L 2209/603
See application file for complete search history.

(56) References Cited

U.S. PATENT DOCUMENTS

| | | | |
|---|---|---|---|
| 7,441,121 B2 * | 10/2008 | Cutter, Jr ................ | G06F 21/10 713/173 |
| 2001/0034834 A1 * | 10/2001 | Matsuyama .......... | H04L 63/062 713/156 |

(Continued)

OTHER PUBLICATIONS

Luan Ibraimi et al: "Ciphertext-Policy Attribute-Based Threshold Decryption with Flexible Delegation and Revocation of User Attributes", Jan. 1, 2009, XP055073794, Faculty of EEMCS, University of Twente, NL. URL:http://doc.utwente.nl/65471/1/Technical Report. pdf [retrieved on Aug. 1, 2013].

(Continued)

*Primary Examiner* — Shahriar Zarrineh
(74) *Attorney, Agent, or Firm* — Hoyng Rokh Monegier; David P. Owen

(57) ABSTRACT

Methods and content consumption devices are disclosed that enable a revocation list to be securely enforced and managed, in terms of enforcing version control and providing granular control of individual capabilities, for example. Aspects also relate to enhanced enforcement control of content consumption control information more generally, for example by enforcing version control of activation messages, and/or granular management of individual capabilities.

15 Claims, 7 Drawing Sheets

(56) References Cited

U.S. PATENT DOCUMENTS

| | | | | |
|---|---|---|---|---|
| 2004/0243827 | A1* | 12/2004 | Aguilera | H04L 63/101 726/27 |
| 2005/0071631 | A1* | 3/2005 | Langer | H04L 9/302 713/156 |
| 2005/0210241 | A1 | 9/2005 | Lee et al. | |
| 2007/0074036 | A1* | 3/2007 | Ramzan | H04L 9/0836 713/176 |
| 2008/0022104 | A1* | 1/2008 | Deishi | H04L 9/3268 713/175 |
| 2008/0134309 | A1* | 6/2008 | Qin | G06F 21/445 726/6 |
| 2008/0304669 | A1* | 12/2008 | Bugbee | H04L 9/0894 380/278 |
| 2009/0177881 | A1* | 7/2009 | Traw | H04L 9/0891 713/158 |
| 2011/0302404 | A1* | 12/2011 | Cohen | H04L 9/0637 713/150 |
| 2012/0189281 | A1* | 7/2012 | Nakano | G11B 20/0071 386/252 |
| 2016/0171186 | A1* | 6/2016 | Marking | H04L 63/126 713/190 |
| 2017/0012782 | A1* | 1/2017 | Dinha | H04L 9/321 |
| 2017/0272250 | A1* | 9/2017 | Kaliski, Jr. | H04L 9/006 |
| 2018/0262347 | A1* | 9/2018 | Levy | H04L 9/006 |

OTHER PUBLICATIONS

Dan Boneh et al:, "A Method for Fast Revocation of Public Key Certificates and Security Capabilities", USENIX, Jan. 2, 2002 (Jan. 2, 2002), pp. 1-13, XP061010992.

Junbeom Hur et al: "Attribute-Based Access Control with Efficient Revocation in Data Outsourcing Systems", IEEE Transactions on Parallel and Distributed Systems, IEEE Service Center, Los Alamitos, CA, US, vol. 22, No. 7, Jul. 1, 2011, pp. 1214-1221, XP011323952, ISSN: 1045-9219.

* cited by examiner

CAPABILITY REVOCATION IN A CONTENT CONSUMPTION DEVICE

FIELD

The present disclosure relates to the secure revocation of a capability of a content consumption device to process and/or display content.

BACKGROUND

In certain settings, it is desirable to manage the capability of a device to display or process content remotely, once the device is already in the field. For example, if it turns out that a certain device or type of device that was considered secure has been compromised, it becomes desirable to stop the device from being capable of displaying content in the future. One approach to this is to distribute a revocation list that identifies devices to be revoked. In practice, such revocation lists have proven difficult to maintain and enforce.

BRIEF DESCRIPTION OF THE DRAWING

Some specific embodiments are described to illustrate aspects and principles of the disclosure by way of example and with reference to the accompanying drawings, in which.

DETAILED DESCRIPTION

Figure 1:
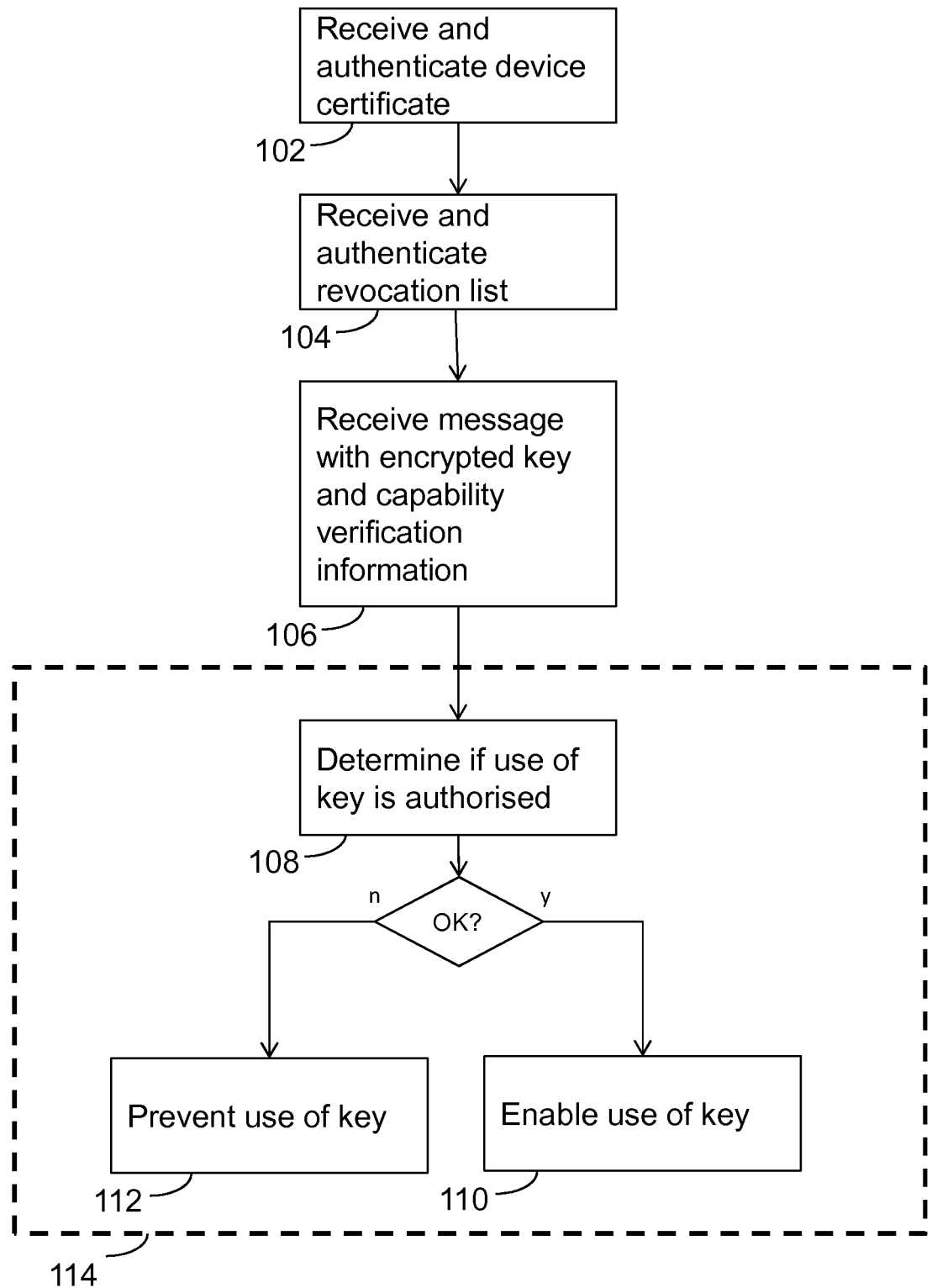
FIG. 1 illustrates a method of using capability verification information to authorise or prevent key use in a content consumption device.

In overview, aspects of the disclosure provide methods and content consumption devices that enable a revocation list to be securely enforced and managed, in terms of enforcing version control and providing granular control of individual capabilities, for example. Aspects also relate to enhanced enforcement of content consumption control information more generally, for example by enforcing version control of activation messages in general, and/or granular management of individual device capabilities in general.

In some aspects, a method of enforcing a revocation list at a content consumption device comprises receiving and authenticating a device certificate. The device certificate comprises device information identifying the content consumption device. The device certificate may further comprise information identifying capabilities of the device, or this information may be stored or provided otherwise. The method also comprises receiving and authenticating a revocation list. The revocation list may be received on its own or as part of an activation message for activating content consumption capabilities, for example content descrambling capabilities. The revocation list identifies one or more respective device capabilities, for example a specific capability such as the display of 4K content or all capabilities (the capability to display any kind of content), that have been revoked from one or more devices. The revoked devices may be identified individually by a make, type and serial number, for example, or a MAC or other address or identifier, or by type or grouping, for example by make, type and/or version, or by an address range.

According to the method, a message is received that comprises capability verification information and a decryption key, which may be encrypted, required to enable descrambling of scrambled content. The decryption key required to enable descrambling of scrambled content may vary periodically and consequently the message may be transmitted and received periodically to provide the content consumption device with the up to date decryption key. As a result, the revocation list is enforced over time as old decryption keys become useless and new decryption keys must be made available for use by the content consumption device to continue processing content.

The verification information and encrypted decryption key may be cryptographically bound together, for example the capability verification information and (encrypted or clear) decryption key may be digitally signed together, for example by digitally signing a combination such as a concatenation of the verification information and the decryption key. Alternatively, or additionally, the verification information and (encrypted or clear) decryption key may be encrypted together. The message and/or verification information may be authenticated separately but this is not essential, in particular when they are cryptographically bound together. The combination of the capability verification information and (encrypted or clear) decryption key may thus be authenticated using the digital signature and/or decrypted to obtain the capability verification information, as the case may be.

Revocation information identifying any revoked capabilities for the content consumption device is determined using the device information and revocation list, for example looking up the device information in the revocation list to find the revocation information. The received capability information comprises needed capability information identifying a capability needed to process the content. The method comprises applying an operation to the capability verification information and revocation information to determine if the content consumption device can use the decryption key to enable descrambling of the content. Advantageously, by enabling revocation of capabilities capability-by-capability, a more flexible and/or granular approach to controlling capabilities is enabled. Further, by tying a check of the revocation list to the receipt and use of a required decryption key, better enforcement of the revocation list is facilitated and revocation may be made harder to circumvent.

In some embodiments, applying the operation comprises determining if the content consumption device shall not be allowed to decrypt the decryption key using the capability verification information and revocation information, as well as version information indicating a version of the revocation list, if applicable. If the determination is positive, use of the decryption key to access the content is prevented, for example preventing decryption of the decryption key in embodiments where the decryption key is encrypted. In these embodiments, the capability verification information, device information and revocation list are thus used to determine if the content consumption device shall not be allowed to decrypt the decryption key and if the determination is positive, use of the decryption key is prevented. For example, determining if the content consumption device shall not be allowed to descramble the content may comprise using the revocation list, device information and needed capability information to determine if the needed capability has been revoked on the content consumption device.

For example, the determination may be made by using the device information to look for the device in the revocation list and if the device (or a group of devices to which the device belongs) is found, making a positive determination if a specific capability that is needed for specific content to be displayed is revoked. The specific content may be content that requires the decryption key to be displayed, for example because the content requires the decryption key to descramble the content or because the decryption key is needed to decrypt an encrypted descrambling key for the content.

Preventing use of the decryption key may comprise not enabling the use of the decryption key if the determination is positive and conversely enabling the use of the key if the determination is negative. Preventing use of the decryption key may comprise not decrypting the key, or if already decrypted, deleting the decrypted decryption key and/or not writing it to a memory location where the content consumption device expects it for further use. For example, in some Conditional Access System embodiments, if the message is a control message received with the content, such as an Entitlement Control Message (ECM), and the decryption key is a descrambling key, such as a Control Word (CW), preventing use may comprise not writing the descrambling key to a table in a memory, for example not writing the CW to a CW table, typically held in a memory of a content consumption device. In some CAS embodiments, the message is an EMM and may contain a decryption key required to decrypt the CW.

In some embodiments, applying the operation comprises forming a combination key by combining the decryption key, capability verification information and revocation information, as well as version information indicating a version of the revocation list, if applicable. The method comprises using the combination key to attempt to descramble the content or to attempt to decrypt a descrambling key for descrambling the content. Descrambling of the content may require a certain combination key that corresponds to the result of the combination in which the capability verification information is consistent with the revocation information, i.e. needed capabilities have not been revoked. Therefore, if needed capabilities have been revoked, the combination key will be different and as a result will fail to descramble the content or fail to decrypt a key required to descramble the content.

Irrespective of whether the operation comprises a determination or evaluation of a condition or forming a combination key as described above, each entry in the revocation list may have corresponding requirement data, for example a corresponding requirement mask and the device information may comprise data identifying device capabilities, that is the capabilities the device has. If there is an entry in the revocation list for a device or group of devices, the corresponding revocation data or mask may be applied to the device capability data to form the combination key or evaluate the condition. If the result is consistent with the needed capability to display the content, the use of the decryption key is enabled, otherwise it is prevented, either explicitly or implicitly. Explicit prevention is triggered by a positive evaluation of the condition and may comprise not decrypting the decryption key as described above. Implicit prevention occurs when the combined key is incorrect due to the operation yielding a result that is different from the result when the capabilities are not revoked. In some embodiments, if the revocation list entry indicates that the device is revoked for all capabilities, use of the key is prevented without further comparison. This may be part of a separate check using only device information and the revocation list prior to receipt of the message, for example at boot-up of the device or activation of a descrambling functionality of the device.

In some embodiments, the operation comprises also applying the operation to device capability information, thus verifying not only that the needed capability is not revoked but also that it is present on the device. As described above for the other information, the device capability information may be used in an explicit comparison or may be used in the computation of the combination key, as the case may be. By also considering device capabilities, it may be possible to prevent faulty processing of the content. In other embodiments, device capabilities are not considered and content processing simply fails if the required capability is not present.

In some embodiments, the capability verification information comprises version verification information and the revocation list is associated with version information indicating a version of the revocation list. In these embodiments, determining if the content consumption device shall not be allowed to descramble the content comprises determining if the version information is inconsistent with the version verification information. For example, inconsistency may be detected if the version verification and version information indicate a different version or if the version information indicates a version that is earlier than that of the version verification information, indicating an out of date revocation list. In embodiments in which a combination key is calculated with both needed capability and version verification information of the capability verification information, the key that is required to descramble the content or decrypt a key required to descramble the content is calculated so that the combination key does not correspond to the required key unless the version of the revocation list is as expected, as well. Advantageously, by also tying version control with the receipt of the message carrying the decryption key, security may be enhanced by preventing out of date revocation lists being used (or preventing the use of pirated revocation lists having manipulated version information, for example to exploit loopholes in revocation list updating).

In some embodiments, operating on the capability verification information and revocation information comprises combining the capability verification information and revocation information. The capability verification information and revocation information may be encoded by respective bitmaps indicating needed and revoked capabilities and maybe combined with a Boolean operation. If both bitmaps have set bits (set to 1) at the same position(s), meaning that the needed capabilities in the former (bit set to 1) are not revoked in the latter (bit set to 1), then combining the bitmaps with a Boolean AND operation will yield the former bitmap as a result. The result of this operation may then be combined with the decryption key to form a new decryption key using a key derivation function, examples of which are known to the skilled person and could include a simple concatenation. The new decryption key can then be used in an attempt to access the content (descramble it/decrypt a descrambling key). This will fail if the new decryption key does not correspond to a protection key used to protect the content (scramble it/encrypt a descrambling key). The content to be accessed may have been protected at source (e.g. a head end or Over The Top content provider) using the protection key derived from the decryption key by combining it with the bitmap encoding needed capabilities in a key derivation function. Consequently, if any of the needed capabilities has been revoked (corresponding bit set to zero in the bitmap encoding the revocation information), access to the content (descrambling of the content or decryption of the descrambling key) fails.

In a similar matter, in some embodiments, version verification information may be encoded in bits of the bitmap encoding needed capabilities and version information related to the revocation list may be encoded in the bitmap encoding revocation information, so that access to the content fails if there is a mismatch with the version of the revocation list, for example.

Additionally, in embodiments where device capabilities are also taken into account, the respective bitmaps encoding capability verification information and revocation information may be combined with a bitmap encoding device capabilities, which may also encode the version information, depending on the embodiment. The three bitmaps may be combined in an analogous manner by Boolean logic operations, for example AND operations. It will be appreciated of course that the operations can be carried out in any order.

In some embodiments, the revocation list is received with an activation message for activating a content consumption capability of the content consumption device, for example activating a descrambling or other functionality and/or specific command(s) or function(s) required for the device to work to consume content, and authenticating the revocation list comprises authenticating the activation message. For example, the method may only authenticate the activation message without further authentication of the revocation list. The method may comprise activating a content descrambling functionality of the content consumption device in response to authenticating the activation message and device certificate. In some embodiments, this may comprise determining if the device is not on the list with all capabilities revoked and preventing activation of the content consumption capability if so, only activating the content consumption capability if not so Some aspects of the disclosure omit the capability verification and consequently do not use capability verification information or the corresponding granular revocation information. Instead, the method may simply trigger the explicit verification described above or a fixed key that tis required to enable descrambling instead of the combination key, as applicable, based on the device being in the revocation list. As a result, in these aspects, content consumption fails if the device is in the revocation list without specifying capability by capability revocation information. Of course, embodiments of these aspects may also employ version verification as described above, for example including this as a bitmap or adding version verification information to the generation of the combination key as described above.

Some aspects extend the above aspects to version control of an activation message more generally. These aspects extend to a method as follows and a content consumption device comprising a processor, for example a hardware state machine or other secure environment, configured to implement such a method. An activation message is used to activate a content consumption capability of a content consumption device, for example activating a descrambling or other functionality and/or specific command(s) or function(s) required for the device to work to consume content. A decryption key, which may be encrypted, is received in a message together with version verification information, for example cryptographically bound together as described above. The version verification information may be used to verify the version of the activation message and if an inconsistency is detected, for example as described above, use of the decryption key is prevented, for example as described above. In other embodiments, the version verification information and version information of the revocation list are combined in an operation forming a combination key as described above. Thus, common to both these embodiments, the version verification and version information are operated on and the result of the operation determines if the content consumption device can use the decryption key to enable descrambling of the content.

These aspects extend to a method of enforcing a version of an activation message at a content consumption device, the method comprising:
 receiving and authenticating an activation message to activate a content consumption capability of the content consumption device, for example activating a descrambling or other function and/or specific command(s) or function(s) required to enable content consumption on the content consumption device, wherein the activation message comprises version information indicating a version of the activation message;
 receiving a message comprising version verification information and an decryption key required to enable descrambling of scrambled content;
applying an operation to the version information and version verification information to determine if the content consumption device can use the decryption key to enable descrambling of content. The content consumption device can use the decryption key if the version verification and version information are consistent.

Further, these aspects extend to a content consumption device comprising:
 one or more receiver modules configured to receive scrambled content and
  a message comprising version verification information and an encrypted decryption key required to enable descrambling of the scrambled content;
 a memory configured to store
  an activation message for activating a content consumption capability of the content consumption device, for example activating a descrambling or other function and/or specific command(s) or function(s) required to enable content consumption on the content consumption device, wherein the activation message comprises version information indicating a version of the activation message; and
 a processing module, for example a hardware state machine or other secure environment, configured to enforce a version of the activation message, the processing module being configured to:
  receive and authenticate the device certificate;
  receive the message;
applying an operation to the version information and version verification information to determine if the content consumption device can use the decryption key to enable descrambling of content.

All features of the version verification aspects, general or specific in the context of revocation lists as described above, are readily combinable in corresponding embodiments, which will be understood to be disclosed.

Other aspects extend to granular capability revocation in general. A revocation list has entries each identifying one or more revoked devices and, for each device, revoked capabilities information about which capabilities of the device are revoked, for example a revocation mask as described above. These aspects extend to such a revocation list, as such, stored in a computer readable format. These aspects further extend to a method as follows, as well as to a content consumption device having a processor, for example a hardware state machine or other secure environment, configured to implement such a method. A content consumption device uses the revocation list in an operation that determines if it can process or descramble received content, implicitly or explicitly as described above. For example, the content may be associated with the needed capabilities information by associating the needed capabilities information with a descrambling key required to descramble the content. The content is associated with needed capabilities information indicating capabilities needed to display the content. The content consumption device has one or more capabilities, for example identified in a device certificate, and if there is a match between the needed capabilities information and the device capabilities that have not been revoked by the revoked capabilities information, the content consumption device processes or descrambles the content, otherwise it does not. Alternatively, prevention or enabling use of the key may be implicit by forming a combination key as described above. For example, in any of the aspects and embodiments that provide granular capability revocation, first content associated with first needed capabilities information that does not match the non-revoked device capabilities may not be processed or descrambled by the content consumption device, while second content associated with second needed capabilities information that does match the non-revoked device capabilities may be processed or descrambled by the content consumption device.

These aspects extend to a method of revoking capabilities at a content consumption device, the method comprising:
  receiving a device certificate, wherein the device certificate comprises device information identifying the content consumption device;
  receiving a revocation list identifying one or more respective device capabilities that have been revoked from one or more devices;
  receiving a message comprising needed capability information identifying a capability needed to process the content;
  applying an operation to the needed capability, device information and revocation list to determine if the content consumption device can process the content. The determination may be explicit and the method may actively prevent processing of the content or the determination may be implicit in that the result of the operation is used in processing the content or to derive a key needed to process the content so that processing fails if the result is not as expected for the needed capabilities not being revoked.

These aspects extend to a content consumption device comprising:
  one or more receiver modules configured to receive content and
    a message comprising needed capability information identifying device capabilities needed to process the content;
  a memory configured to store
    a device certificate, wherein the device certificate comprises device information identifying the content consumption device, and
    a revocation list identifying one or more respective device capabilities that have been revoked from one or more devices; and
  a processing module, for example a hardware state machine or other secure environment, configured to enforce the revocation list, the processing module being configured to:
    receive the device certificate;
    receive the revocation list;
    receive the message;
    applying an operation to the needed capability, device information and revocation list to determine if the content consumption device can process the content.

In both aspects, the operation may comprise determining revocation information indicating revoked capabilities for the device using the revocation list and device information. The revocation information and needed capabilities information may then be processed, either to make an explicit determination and preventing processing of the content implicitly, or using the result of the operation in the processing, so that the processing fails if the result is not as expected for the needed capabilities not being revoked. In some embodiments, device capabilities are also used in this process, as described above.

It will be understood that features of all granular capability revocation aspects, in general or more specifically as described above are readily combinable and that all such combinations are disclosed.

In some embodiments of any of the above aspects and methods, the method is implemented in an isolated execution environment, for example a Trusted Execution Environment (TEE) or Secure Element (SE) or any other execution environment isolated in software or hardware, for example in a hardware state machine. The isolated execution environment prevents and/or controls access from outside the isolated execution environment to resources such as memory and processing capacity inside the isolated execution environment. In some embodiments, preventing use of the decryption comprises preventing access to the decryption key from outside the isolated execution environment, for example preventing storage of the decryption key outside the isolated execution environment.

Further aspects extend to a content consumption device implementing the method(s) according to the aspects and embodiments described above. For example, each content consumption device may comprise a memory storing coded instructions for implementing the method(s) when run and/or a processor, for example a hardware state machine or other secure environment, configured to implement such method(s), for example by running the instructions stored in the memory.

It will be appreciated that in these aspects the device certificate is typically stored in the device and received internally in the device, the revocation list (as part of an activation message or otherwise) is typically stored internally in the device or may be received from an external source and the message is typically received from an external source. The revocation list, message and activation message may be received from the external source in a broadcast, for example in a data carousel broadcast over-the-air, over satellite or over cable, or, in the case of connected devices, may be received over an internet or other data connection. In embodiments comprising an isolated execution environment, the device certificate, revocation list/activation message and message may be received by the isolated execution environment from the remainder of the device outside the isolated execution environment, for example from memory or a data and/or content receiving module of the content consumption device.

Yet further aspects extend to a computer program product comprising, or a tangible computer readable medium encoding, computer instructions that, when run on a computing device, implement one or more methods as described above.

With reference to FIG. 1, a method of enforcing a revocation list at a content consumption device is now described. For example, the method may be implemented in an isolated execution environment of the content consumption device, for example in a secure element. At step 102, a device certificate is received and authenticated (for example by verifying a digital signature associated with the certificate). The device certificate identifies the content consumption device and its capabilities for accessing content, for example the ability to process Standard Definition (SD), High-Definition (HD) and/or 4K content. At step 104, a revocation list is received and authenticated. For example, the revocation list may be received as part of an activation message that activates a content descrambling functionality of the content consumption device. At step 106, a message, for example an ECM or EMM in the context of a CAS, is received. The message comprises an encrypted decryption key and capability verification information. The capability verification information is used to verify whether the device has the needed capabilities to process content with which message is associated and that this capability has not been revoked. For example, the capability verification information may indicate that a capability to process 4K content is needed. The capability verification information will be described in more detail below. The decryption key is needed to descramble the content associated with the message, either by directly being used to descramble the content or to decrypt a key that is used to descramble the content. For example, in the conventional use of these messages, if the message is an ECM, the decryption key would typically be a CW used to descramble the content, whereas if the message would be an EMM, which is sent less frequently, the decryption key would typically be a key that is used to decrypt encrypted CWs so that the decrypted CWs can be used.

At step 108, the capability verification information, revocation list and device certificate are used to determine if use of the decryption key is authorised. For example, a determination is made whether the device has the needed capability indicated by the capability verification information that is not revoked for the device by the revocation list. In some embodiments, use of the key may not be authorised if the device is present in the revocation list, irrespective of which capabilities are revoked (in which case needed capability information may not be present in the capability verification information). In either case, in some embodiments, the capability verification information may comprise version verification information and key use may not be authorised if the version of the revocation list this is inconsistent with the version verification information.

It will be appreciated that other criteria may be applied, such as the presence of an entitlement to process the content in the device, for example based on subscriptions a user of the device has. It will further be appreciated that if the determination of any one of the criteria indicates that the use of the key should not be authorised, key use may be prevented. Consequently, if all criteria have been met, use of the decryption key is enabled at step 110. For example, in the case of the decryption key being a CW, the CW is then stored in a CW table accessible to a descrambler. In the case of a decryption key for decrypting encrypted CWs, the decryption key may be stored in a secure memory for later use. If the determination is that the use of the key is not authorised, use of the keys prevented at step 112, for example by not writing the key to a memory location, such as a CW table, by not decrypting the decryption key and/or deleting the decryption key if already decrypted. Steps 108 to 112 collectively provide an embodiment of a step 114 of operating on needed capability and revocation information (at least) to determine if the received key can be used to access the content, specifically to descramble the content or to decrypt a key needed to descramble the content, for example as described in further detail below. Alternative embodiments of step 114 are described below. These embodiments replace an explicit determination of whether to prevent access or not with an operation the result of which is used in accessing content. As a result, access fails if the result is incorrect, for example due to a mismatch between capability verification information and revocation information.

Advantageously, by associating the capability verification information with the decryption key, the enforcement of the revocation list is enhanced since it is closely tied with the core capability of processing content, which requires the decryption key. Typically, the encrypted key will change periodically, for example every few seconds in the case of an ECM or every few tens of minutes in the case of an EMM, for example, and so the revocation list is continuously enforced if up-to-date decryption keys are to remain available to the device. Enforcement can further be secured by cryptographically binding the decryption key and capability verification information together, for example digitally signing a combination of the decryption key (encrypted or clear) with the capability verification information, for example a concatenation of the two. The authenticity of the capability verification information and of its link to the key can then be authenticated by verifying the digital signature. Alternatively, or additionally, a combination (concatenation) of the capability verification information and (encrypted or clear) key can be encrypted and distributed in this form in the message, making tampering with the capability verification information and its link to the key difficult or impossible in practice.

Figure 2:
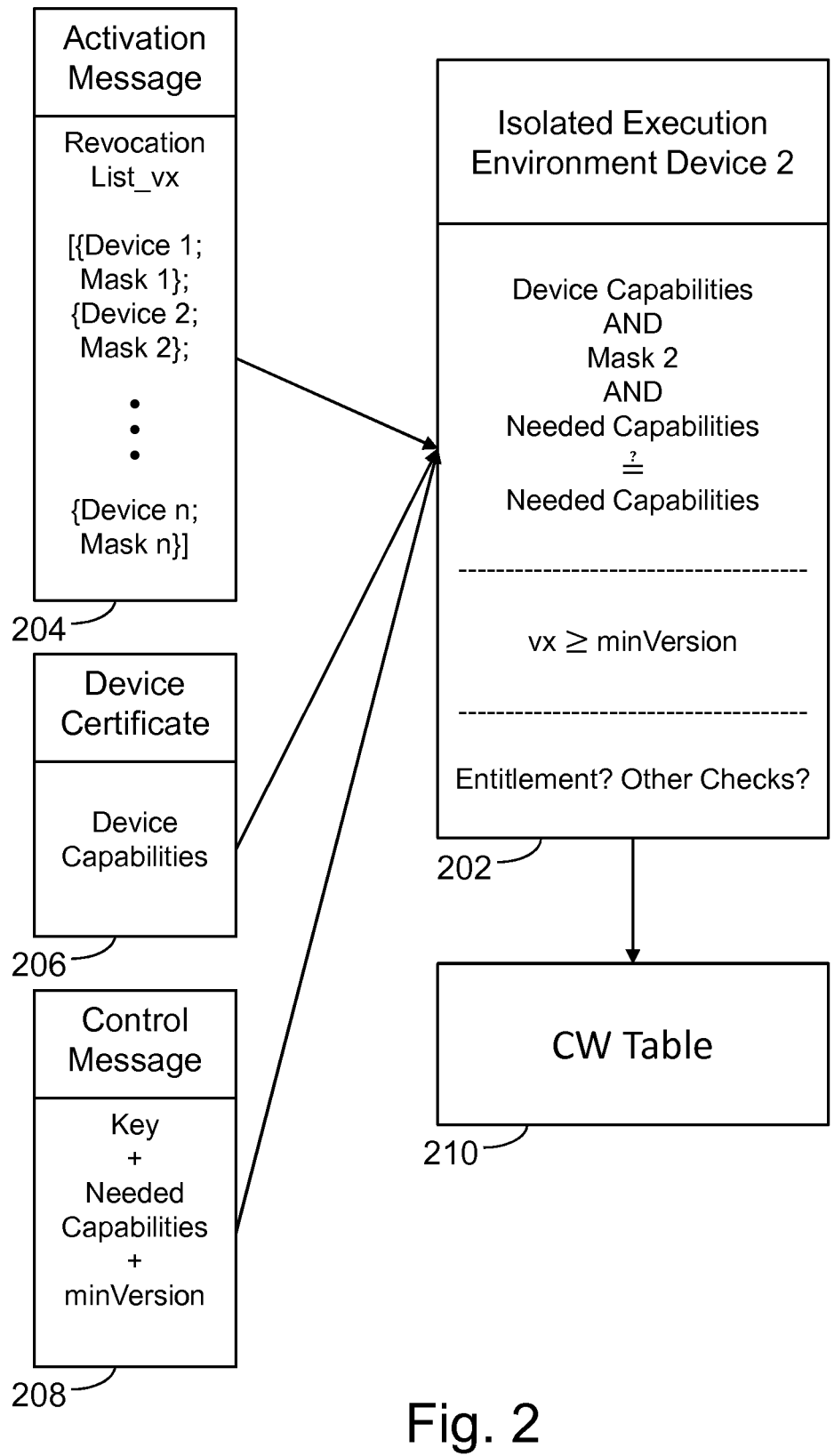
FIG. 2 illustrates the use of capability verification information in an isolated execution environment of a content consumption device.

In more detail, in a specific implementation now described with reference to FIG. 2, to enforce a revocation list, an isolated execution environment 202 of a particular device ("Device 2" in this example) receives an activation message 204 and a device certificate 206. The isolated execution environment 202 receives this data from a persistent memory that may be located inside or outside the isolated execution environment 202 in the content consumption device. The isolated execution environment 202 uses the activation message 204 and device certificate 206 to activate a content processing functionality, for example a content descrambling functionality of the content consumption device once the activation message 204 and device certificate 206 have been authenticated.

The activation message comprises a revocation list, which in turn comprises version information and a list of revoked devices. The list of revoked devices comprises pairs of device identifiers identifying devices for which capabilities have been revoked and a respective capabilities mask for each device identifier, indicating which capabilities of each device have been revoked. Capabilities may include the ability to process SD, HD and/or 4K content, for example, the capability mask may be a bitmap in which each bit represents a corresponding capability, for example, a 0 indicating that the capability is revoked and a 1 indicating that the capability is not revoked. A default mask may have all bits set to 0, revoking all capabilities. Prior to activating the content descrambling functionality, the isolated execution environment may, on some implementations, scan the revocation list to check if the device in question is present in the revocation list and if so if all device capabilities have been revoked. In that case, the isolated execution environment 202 may not activate the descrambling functionality and may, for example, create an error message that can trigger an exception such as a display of an error message to a user.

Once the descrambling functionality has been activated, content to be descrambled can be received. The content is received by the content consumption device with control messages 208, for example an ECM in a CAS, comprising a descrambling key, needed capabilities information, for example a bitmap with a 1 set for each needed capability and 0 otherwise, and a minimum version requirement for the revocation list (or activation message 204). The key, needed capabilities and version verification information may be cryptographically bound together as described above. Typically, the descrambling key required to descramble the content changes periodically and, accordingly, control messages are sent periodically to provision the content consumption device with descrambling keys, typically referred to as CW, that are up-to-date to enable descrambling of the content.

As a control message 208 is received, the isolated execution environment determines if the needed capabilities are present and not revoked in the content consumption device by checking if the needed capabilities match the device capabilities if the device is not in the revocation list and if the needed capabilities are not revoked if the device is on the revocation list.

In the latter case, in one specific example, if the device capabilities, revocation mask and needed capabilities are all expressed as respective bitmaps, the isolated execution environment may combine the device capabilities, revocation mask and needed capabilities with respective AND operations and check if the result is equal to the needed capabilities bitmap, for example using another AND operation.

To enforce an appropriate version of the revocation list and close a loophole by which an outdated revocation list could be used to escape revocation, a further check is done by the isolated execution environment 202 check that the version of the revocation list (or activation message 204) is consistent with version verification information received with the control message. For example, the version verification information may be a minimum version required for the revocation list or activation message 204 and the consistency check may check that the version of the revocation list or activation message 204 is higher than the minimum version.

The isolated execution environment may carry out further checks not connected to device revocation, for example checking for the presence of suitable entitlements, subscriptions, et cetera and only enable use of the encrypted decryption key if all conditions are met, for example only decrypting the decryption key and writing it to a memory 210, typically referred to as a CW table, where it is available for a descrambler to use. Conversely, if any of the conditions are not met, the selected execution environment 202 determines that use of the key is not to be authorised and prevents use of the key, for example by not decrypting it and/or not writing it to the memory 210.

Figure 3A:
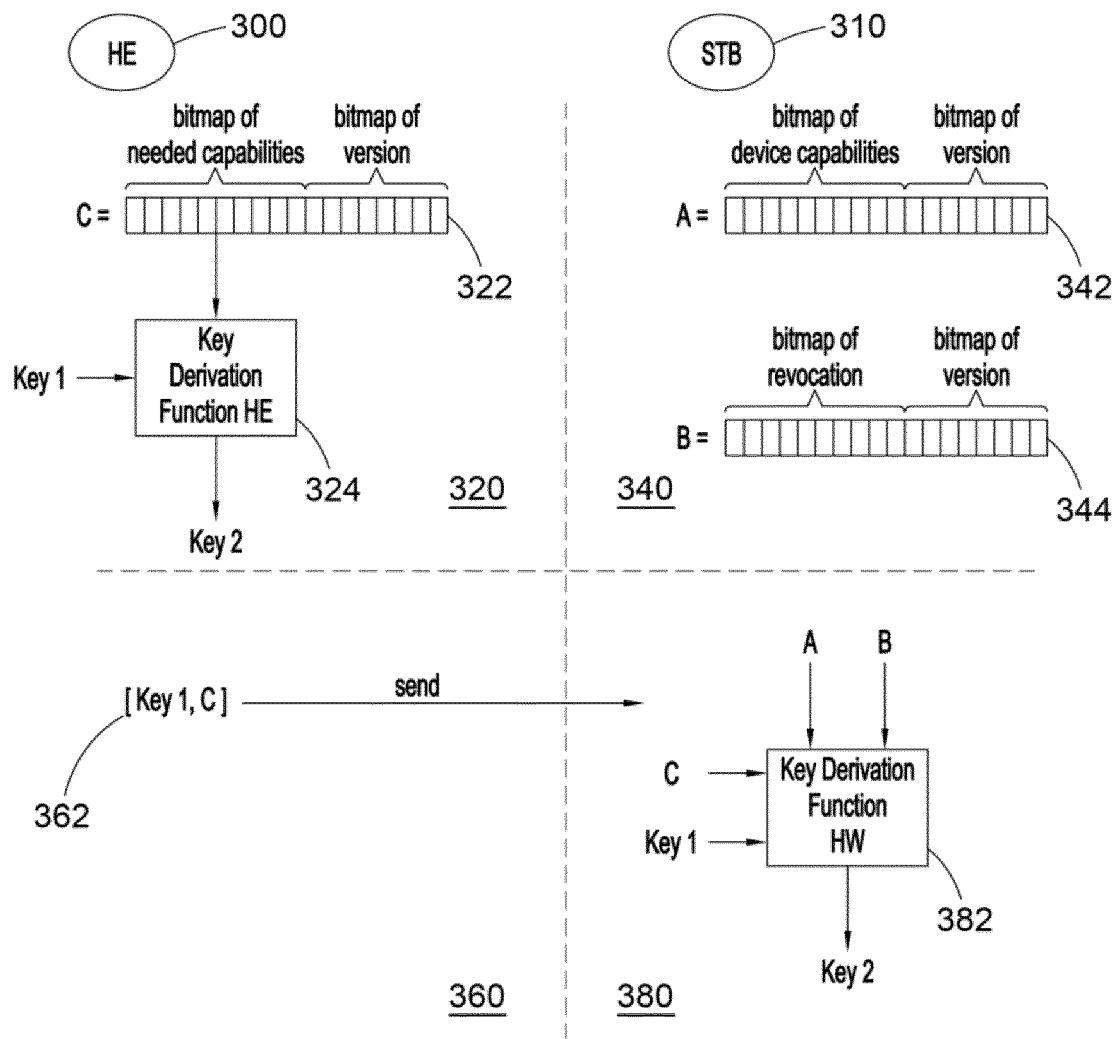
FIGS. 3A and 3B illustrate a method of using capability verification information to control access to content in a content consumption device.
Figure 3B:
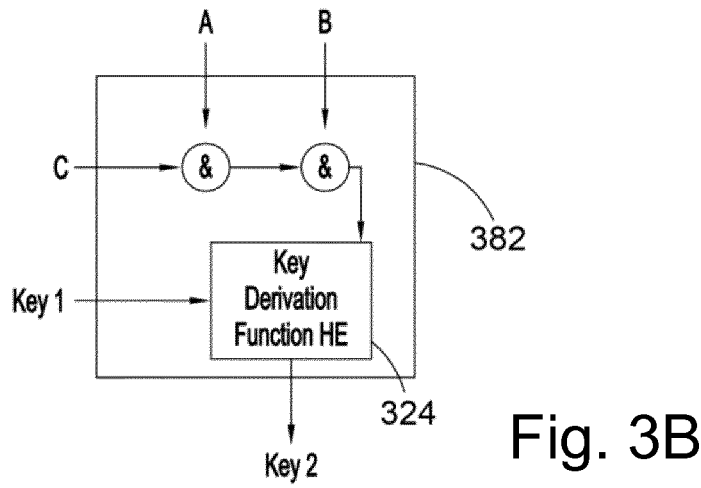

With reference to FIGS. 3A and 3B, a specific implementation is now described that does not rely on explicit evaluation of conditions but rather includes various items of information in a cryptographic process, thereby enabling successful completion of cryptographic process only if the right information is present and, consequently, determining whether access to the content is possible. A head end 300, or other content source or provider, for example an Over The Top source, generates a protection key (Key 2) that is used for content protection, for example used as a descrambling key or a key to decrypt a descrambling key. Head end 300 protects content with the protection key accordingly, using it to scramble the content or encrypt a descrambling key used for descrambling scrambled content, for example. The content and (encrypted) descrambling key are then transmitted to a set-top box 310, or other content consumption device. The set top box 310 stores a revocation list listing revoked devices. The revocation list may be associated with an activation message 204, as described above with reference to FIG. 2. The skilled person will be familiar with the use of such protection keys in general to protect content but the generation of the protection key at the head end 300 and its recovery at the set top box 310 are now described in detail.

At a step 320, the headend processes a transmission key (Key 1) together with a bitmap 322 using a key derivation function 324 to generate the protection key. The bitmap 322 comprises a first portion in which bits represent capabilities that are needed to process the content (e.g. 4K, HD, SD, encryption capabilities) and a second portion in which bits represent a required version of the revocation list with which the bitmap 322 will be processed at the set top box 310. In some embodiments, each bit in this portion represent a version of the revocation list and a specific version may be required by setting a specific bit. A minimum version may be required by setting all bits corresponding to the minimum version and higher versions. Other subsets are of course equally possible. The version bitmap is not present in some embodiments that do not enforce a version (or versions) of the revocation list.

The set top box 310, at a step 340, stores a bitmap 342 comprising a portion representative of device capabilities in the format of the first portion of the bitmap 322 and a portion representative of a version of the revocation list stored at the set top box in the format of the second portion of the bitmap 322. The set top box 310 also stores a bitmap 344 comprising a portion representative of revoked device capabilities in the format of the first portion of the bitmap 322 and a second portion that is the same as the second portion of the bitmap 342. Bitmaps 342 and 344 may be generated and/or stored at run time, at boot up or may be stored and kept in non-volatile memory of the set top box 310. Specifically, the first portion of the bitmap 344 may be stored in the revocation list and accessed based on device information or may be generated from information corresponding to the device in the revocation list. The bitmap 344 may also be stored in its entirety in the revocation list or may be generated by adding the first and second portions together.

At a step 360, the head end 300 sends a message 362 comprising the transmission key and the bitmap 322 (which represents needed capability and version verification information) to the set top box 310. The message corresponds to the control message 208 described above with reference to FIG. 2.

At a step 380, the set top box 310 receives the message 362 and processes the transmission key and bitmap 322 with a key derivation function 382 that also take the bitmaps 342, 344 as an input. Specifically, with reference to FIG. 3B, the key derivation function 382 takes the bitmap 322 as input and combines it with bitmaps 342 and 344 using respective Boolean AND operations. The result of the operations is supplied as an input to a key derivation function the same as key derivation function 324, together with the transmission key. Thus, if the version bitmap matches the version of the revocation list, as discussed above, and the needed capabilities, device capabilities and revoked capabilities bitmaps 322, 342 and 344 match, the result of the operation will be the same as the needed capability bitmap 322 used in step 320 for key generation. Consequently, the output of the key derivation function 384 will be the correct protection key used to protect the content. In the event of a mismatch, the result will not yield the correct protection key, so that it will not be possible descramble/process the content because the correct protection key was not recovered. An attempt to use the incorrect recovered key to descramble the content or to decrypt a descrambling key thus fails and hence consumption of the content is prevented.

The set top box 310 may implement an isolated execution environment 202 as described with reference to FIG. 2 and process the device certificate 206 and revocation list as described above, with the difference that the content of the control message 208 and its processing in the isolated execution environment 202 varies as described with reference to FIGS. 3A and 3B.

It will be appreciated that, while an isolated execution environment such as an TEE or SE, provides security benefits, in other embodiments the described functionality may be implemented in any type of execution environment, for example a rich execution environment (REE). It will further be appreciated that while the revocation list may naturally be provided as part of an activation message for a descrambling mechanism, in further embodiments the revocation list may be provided separately and/or no activation message may be used. The example described with reference to FIG. 2 uses a control message such as an ECM received with content to convey needed capabilities and version verification information but it will be appreciated that other messages may be used, for example management messages that are sent less frequently, such as EMM. In this and other cases, rather than providing the needed capabilities and version verification information together with a descrambling key, they may be provided together with another decryption key that is in turn needed to decrypt a descrambling key or CW received more frequently to descramble the content.

Figure 4:
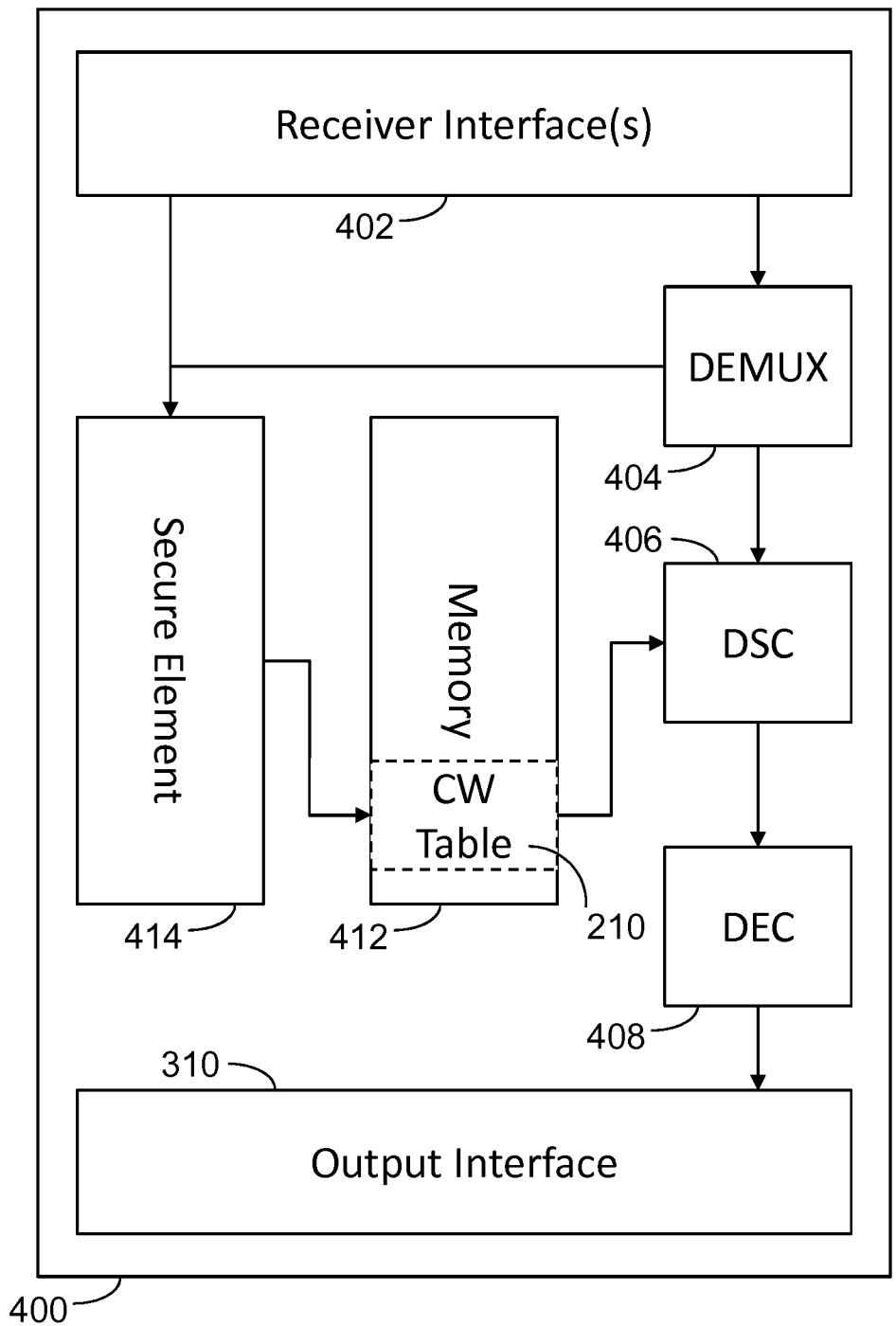
FIG. 4 illustrates an implementation of a content consumption device.

With reference to FIG. 4, a content consumption device 400 that may implement a method and isolated execution environment as described above with reference to FIGS. 1 to 3 comprises one or more receiver interfaces 402. The one or more receiver interfaces 402 are configured to receive content to be descrambled and processed and the (control and/or management) messages. The messages may be received over the same medium or channel as the content and may be embedded in the content, in which case only a single receiver interface is required. Alternatively, the messages may be received over a separate medium or channel, in which case, typically, separate respective receiver interfaces are implemented. The receiver interface or interfaces may be configured to receive content and/or messages from an over-the-air source, a satellite source or a cable source, or from a server over the Internet, as the case may be. Content may be distributed as a video stream, for example an MPEG-2 compliant video stream, in which messages may be embedded, or sent separately.

Content received by the one or more receiver interfaces 402 is demultiplexed by a demultiplexer 404, descrambled by a descrambler 406 and the resulting video frames are processed by a video decoder 408 to be output via an output interface 410. The output interface 410 may be a connection interface, such as an HDMI interface in the case that the content consumption device 400 is, for example, a set-top box or other device without a display screen. Alternatively, or additionally, the output interface 410 may be a display screen for displaying the content, as may be the case in an integrated smart television.

A memory 412 of the content consumption device 400 may comprise both volatile and non-volatile memory, for example both RAM and ROM or flash memory, and is configured to store the activation message 204 and device certificate 206. In particular, the device certificate 206 may be provided in ROM and the activation message 204 may be provided in a flash memory and updated periodically by data received from the one or more receiver interfaces 402. Memory 412 further stores the CW table or similar memory 210, typically in flash memory or other persistent writable memory, or in RAM.

The isolated execution environment 202 is implemented in a secure element 414 and configured to receive messages from the receiver interface 402 (or from the decoder 404 in the case of messages embedded in content), to implement the functionality described above for the isolated execution environment 202 and to write descrambling keys to the CW table or similar memory 210 in the memory 412.

It will be understood that the secure element may be implemented in software or hardware and may be replaced by a trusted execution environment in some embodiments. In some embodiments, the secure element is implemented in hardware, and may be removable from the content consumption device 400, for example, the secure element 414 may be implemented as a smart card or other removable device, for example connected to the remainder of the content consumption device 400 by a serial port. It will be appreciated that the specifics of the content processing pipeline (decoder 404, descrambler 406 and video coder is 408, as well as output interface 410) are not central to the present disclosure inasmuch as it relates to enforcement of revocation lists, granular capability revocation and/or version enforcement in general.

While the embodiments described above with reference to FIGS. 1 and 2 check both for non-revoked capabilities and version consistency, in some embodiments only one of these checks may be carried out. For example, capability by capability revocation may be implemented without a version check or a revocation mechanism that revokes entire devices without capability granularity but enforces version requirements may be used in some embodiments. In some embodiments, version enforcement of an activation message finds application beyond the context of revocation lists and can be used to enforce version requirements on an activation message that may or may not comprise a revocation list.

Figure 5:
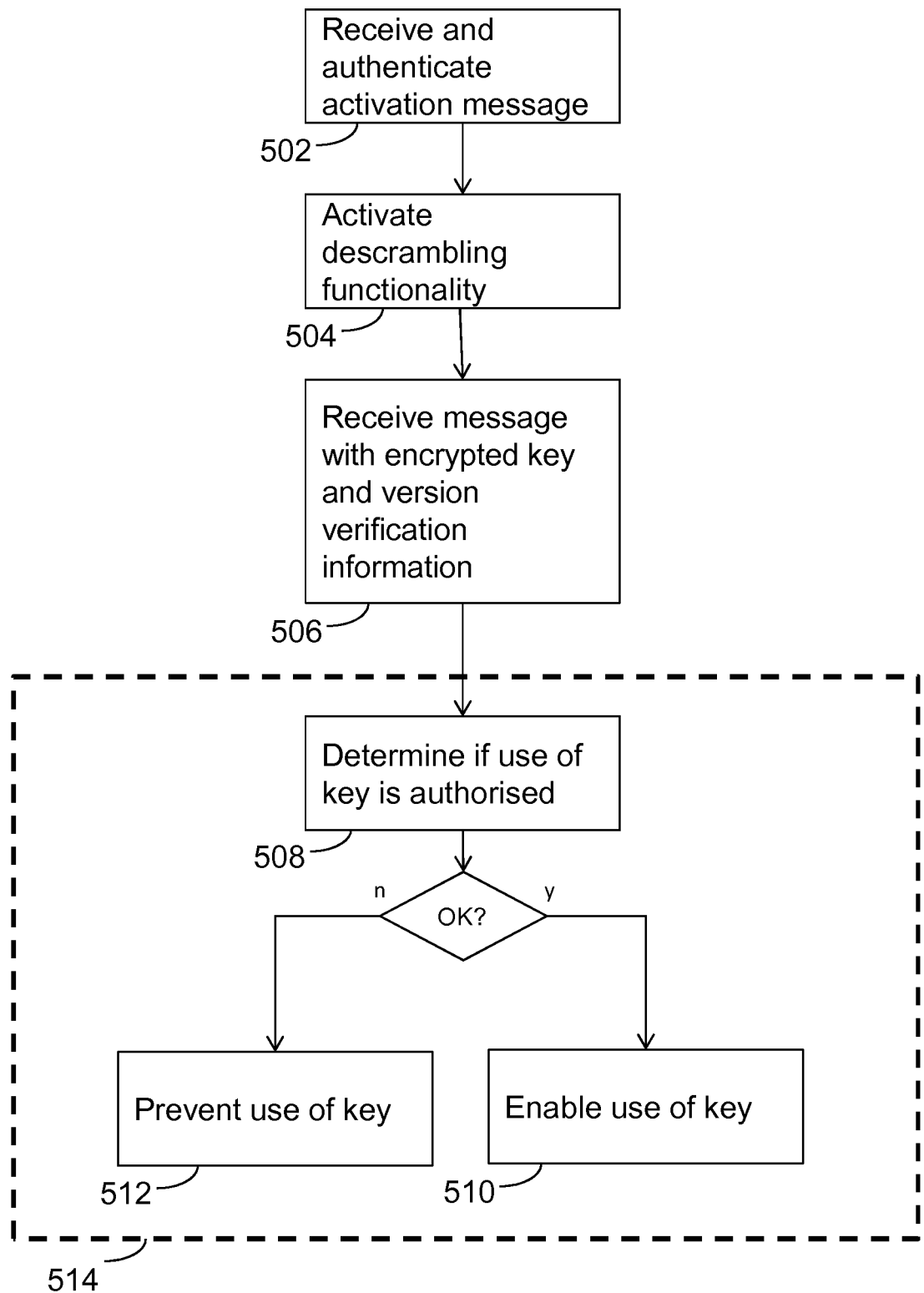
FIG. 5 illustrates a method of verifying a version of an activation message.
Figure 6:
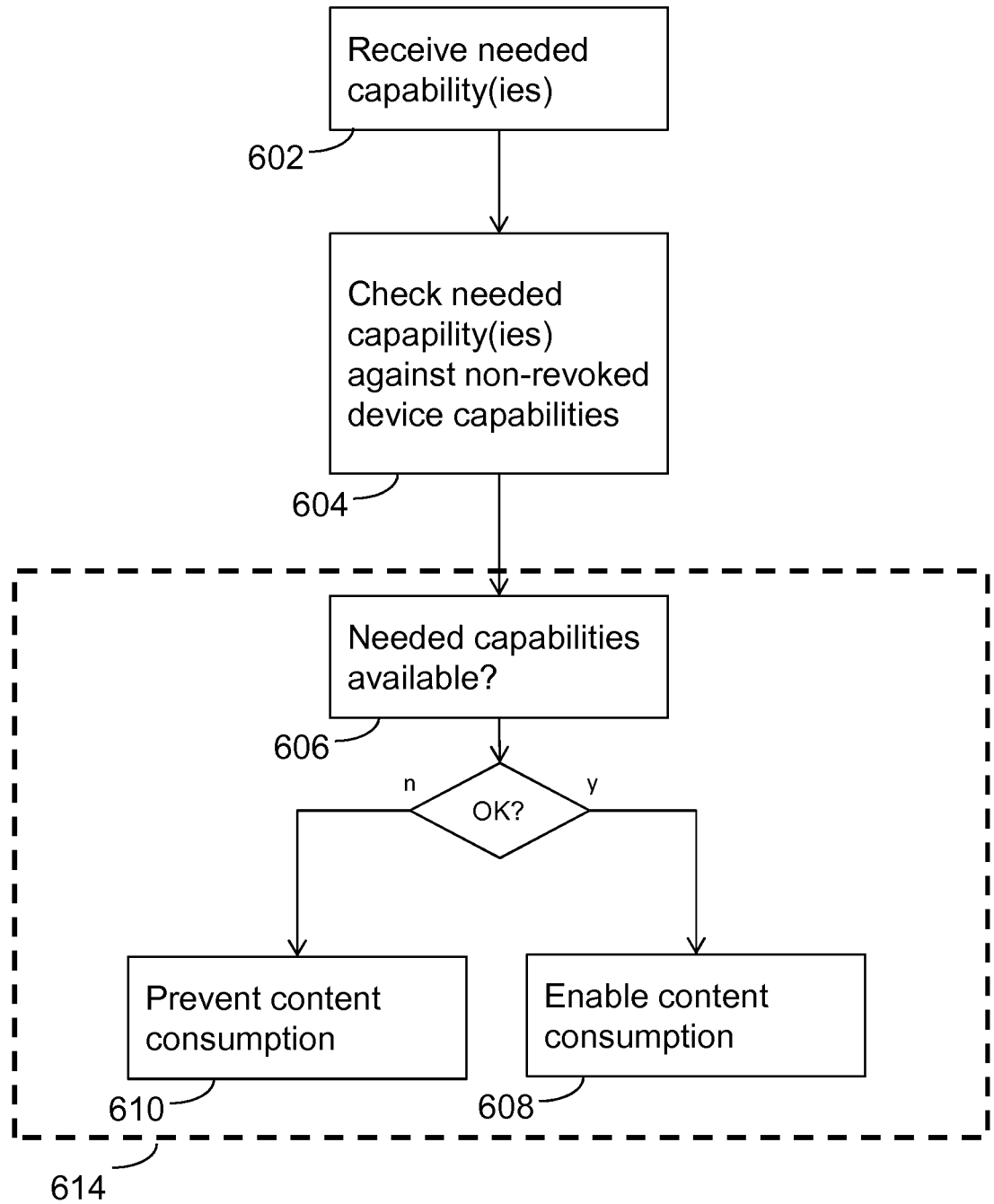
FIG. 6 illustrates a method for granular revocation of capabilities.

Some such embodiments are now described with reference to FIG. 5 and FIG. 6 illustrating corresponding methods. It will be appreciated that these methods may be implemented with the relevant information flows as described above with reference to FIG. 2, in a content consumption device 400 as described above with reference to FIG. 4.

With reference to FIG. 5, a method of verifying a version of an activation message for activating a descrambling functionality of a content consumption device is now described. At a step 402, an activation message is received and authenticated and, upon successful authentication, a descrambling functionality is activated at step 404, for example as described above. At step 406, a message, for example an EMM or ECM, or other message as described above, is received with an encrypted decryption key required for descrambling content, either directly or indirectly, as described above, together with version verification information. The version verification information may be cryptographically bound together with the key, as described above. At step 408, the received version verification information is used to verify the version of the activation message, for example to determine if there is a match or whether the activation message is out of date, for example as described above. If the determination is positive, use of the key is enabled at step 510, otherwise use of the key is prevented at step 512.

Steps 508 to 512 collectively provide an embodiment of a step 514 of operating on version verification and version information (at least) to determine if the received key can be used to access the content, specifically to descramble the content or to decrypt a key needed to descramble the content, for example as described in further detail below. Alternative embodiments of step 514 replace an explicit determination of whether to prevent access or not with an operation the result of which is used in accessing content. Consequently, access fails if the result is incorrect, for example due to a mismatch between capability verification information and revocation information, as has been described above.

Enabling and preventing use of the key has been described above in the context of FIGS. 1 to 4 and this disclosure is equally applicable here. Naturally, it will be appreciated that the activation message 204 need not contain a revocation list and may instead or additionally contain information, such as configuration information or keys required to activate the descrambling functionality. Since the version control discussed here with reference to FIG. 5 is not specific to revocation lists, the version information is associated with the activation message itself. Additionally, the device certificate 206 may or may not be used in such embodiments and the control message 208 correspondingly does not need to specify needed capabilities.

In some embodiments, granular control of revoked capabilities is implemented independent of a specific mechanism to secure enforcement of the revocation and/or check version information. With reference to FIG. 6, in such embodiments, needed capability information is received at step 602, for example as described above with reference to FIGS. 1 to 4, specifically with reference to step 106, and the needed capabilities information included in the control message 208. However, in some such embodiments, no or different security measures are employed. At step 604, the needed capabilities, which may have been received with the content, in a control message or otherwise, or in any other way from the content provider, is checked against non-revoked device capabilities, for example as described above with reference to the processing of bitmaps for each of the device capabilities, revocation mask and needed capabilities in the isolated execution environment 202. At step 606, it is determined whether the result of the check at step 604 indicates that the needed capability or capabilities are available and, if so, consumption of the content (processing of the content) is enabled at step 608. Otherwise, content consumption is prevented at step 610. Steps 606 to 608 collectively provide an embodiment of a step 614 of operating on needed capability and revocation information (at least) to determine if the received key can be used to access the content, specifically to descramble the content or to decrypt a key needed to descramble the content, for example as described in further detail below. Alternative embodiments of step 614 replace an explicit determination of whether to prevent access or not with an operation the result of which is used in accessing content. Consequently, access fails if the result is incorrect, for example due to a mismatch between capability verification information and revocation information, for example as described above. Enabling or prevention of content consumption may be based on the enabling or prevention of descrambling, for example enabling or prevention of the use of a specific key or keys, as described above in more detail with reference to FIGS. 1 to 4.

Figure 7:
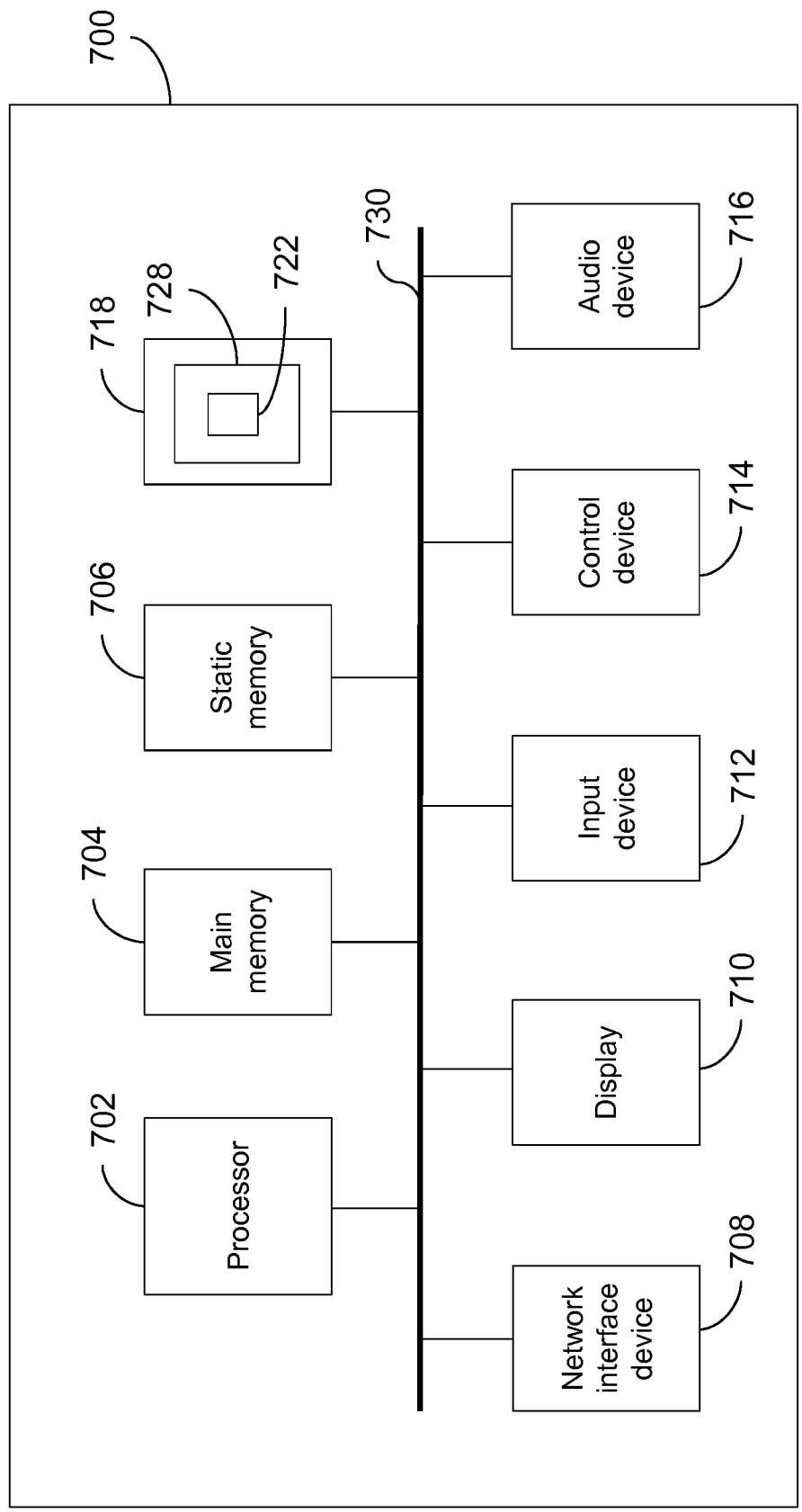
FIG. 7 illustrates a computing platform.

FIG. 7 illustrates a block diagram of one implementation of a computing device 700 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein. The computing device may comprise or be embodied in a secure element to provide secure computations isolated from other parts of a computing device in which the secure element is embedded. The computing device may be a system on chip.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory (e.g., a data storage device 718), which communicate with each other via a bus 640.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 722) for performing the operations and steps discussed herein.

The computing device 700 may further include a network interface device 708. The computing device 700 also may include a video display unit 710 (e.g., a liquid crystal display (LCD) or a cathode ray tube (CRT)), an alphanumeric input device 712 (e.g., a keyboard or touchscreen), a cursor control device 714 (e.g., a mouse or touchscreen), and an audio device 716 (e.g., a speaker).

The data storage device 718 may include one or more machine-readable storage media (or more specifically one or more non-transitory computer-readable storage media) 728 on which is stored one or more sets of instructions 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting computer-readable storage media.

The example computing device 700 may comprise, or implement, a content consumption device implementing the methods described above. For example, the computing device 700 may comprise or implement a content consumption device 400 as described above with reference to FIG. 4.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying", "computing", "generating", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method of enforcing a revocation list at a content consumption device, the method comprising:
   receiving and authenticating a device certificate, wherein the device certificate comprises device information identifying the content consumption device;
   receiving and authenticating a revocation list identifying one or more respective device capabilities that have been revoked from one or more devices;
   determining revocation information identifying revoked capabilities for the content consumption device using the device information and the revocation list;
   receiving a message comprising capability verification information and an decryption key required to enable descrambling of scrambled content; and
   applying an operation to the capability verification information and revocation information to determine if the content consumption device can use the decryption key to enable descrambling of the content.

2. A method according to claim 1, wherein the capability verification information comprises version verification information indicating a required version of the revocation list and applying the operation comprises applying the operation to the capability verification information, revocation information and version information indicating a version of the revocation list to determine if the content consumption device can use the decryption key to access the content.

3. A method as claimed in claim 1, wherein applying the operation comprises determining if the content consumption device shall not be allowed to decrypt the decryption key using the capability verification information, revocation information and, if the capability verification information comprises version verification information, version information and, if the determination is positive, preventing use of the decryption key.

4. A method according to claim 1, wherein
applying the operation comprises forming a combination key by combining the decryption key, capability verification information, revocation information and, if the capability verification information comprises version verification information, version information; and wherein
the method comprises using the combination key to attempt to descramble the content or to attempt to decrypt a descrambling key for descrambling the content.

5. A method according to claim 1, wherein the verification information and the encrypted decryption key are cryptographically bound together.

6. A method according to claim 1, wherein the method is implemented in an isolated execution environment and preventing use comprises preventing storage of the decryption key outside the isolated execution environment.

7. A method according to claim 1, wherein the revocation list is received with an activation message for activating a descrambling functionality of the content consumption device and authenticating the revocation list comprises authenticating the activation message, the method comprising activating a content descrambling functionality of the content consumption device in response to authenticating the activation message and device certificate.

8. A method according to claim 1, wherein the message is an entitlement management message and the decryption key is required to decrypt an encrypted descrambling key received with the scrambled content; or wherein the message is an entitlement control message and the decryption key is a descrambling key.

9. A content consumption device comprising:
one or more receiver modules configured to receive
scrambled content and
a message comprising capability verification information and a decryption key required to enable descrambling of the scrambled content;
a memory configured to store
a device certificate, wherein the device certificate comprises device information identifying the content consumption device, and
a revocation list identifying one or more respective device capabilities that have been revoked from one or more devices; and
a processing module configured to enforce the revocation list, the processing module being configured to:
receive and authenticate the device certificate;
receive and authenticate the revocation list;
receive the message;
determine revocation information identifying revoked capabilities for the content consumption device using the device information and the revocation list; and
apply an operation to the capability verification information and revocation information to determine if the content consumption device can use the decryption key to enable descrambling of the content.

10. A device according to claim 9, wherein the capability verification information comprises version verification information indicating a required version of the revocation list and applying the operation comprises applying the operation to the capability verification information, revocation information and version information indicating a version of the revocation list to determine if the content consumption device can use the decryption key to access the content.

11. A device according to claim 9, wherein applying the operation comprises determining if the content consumption device shall not be allowed to decrypt the decryption key using the capability verification information, revocation information and, if the capability verification information comprises version verification information, version information and, if the determination is positive, preventing use of the decryption key.

12. A device according to claim 9, wherein
applying the operation comprises forming a combination key by combining the decryption key, capability verification information, revocation information and, if the capability verification information comprises version verification information, version information; and wherein
the processor is configured to use the combination key to attempt to descramble the content or to attempt to decrypt a descrambling key for descrambling the content.

13. A device according to claim 9, wherein the verification information and the encrypted decryption key are cryptographically bound together.

14. A device according to claim 9 comprising an isolated execution environment, wherein the processor module is implemented in the isolated execution environment and preventing use comprises preventing storage of the decryption key outside the isolated execution environment.

15. A device according to claim 9, wherein the revocation list is stored as part of an activation message for activating a descrambling functionality of the content consumption device and receiving and authenticating the revocation list comprises receiving authenticating the activation message, and wherein the processor module is configured to activate a content descrambling functionality of the content consumption device in response to authenticating the activation message and, optionally, the device certificate.

* * * * *